(12) United States Patent
Hiltzik et al.

(10) Patent No.: US 6,540,815 B1
(45) Date of Patent: Apr. 1, 2003

(54) METHOD FOR REDUCING EMISSIONS FROM EVAPORATIVE EMISSIONS CONTROL SYSTEMS

(75) Inventors: Laurence H. Hiltzik, Charleston, SC (US); Jacek Z. Jagiello, Charleston, SC (US); Edward D. Tolles, Charleston, SC (US); Roger S. Williams, Lexington, VA (US)

(73) Assignee: MeadWestvaco Corporation, Stamford, CT (US)

( * ) Notice: Subject to any disclaimer, the term of this patent is extended or adjusted under 35 U.S.C. 154(b) by 0 days.

(21) Appl. No.: 10/100,362

(22) Filed: Mar. 18, 2002

Related U.S. Application Data
(60) Provisional application No. 60/335,897, filed on Nov. 21, 2001.

(51) Int. Cl.$^7$ ............................ F02M 33/02; B01D 53/04
(52) U.S. Cl. ........................... 95/146; 95/900; 123/519
(58) Field of Search ............................. 95/90, 146, 148, 95/900–903; 96/132, 133, 147; 123/518, 519; 502/416

(56) References Cited

U.S. PATENT DOCUMENTS

| | | | | |
|---|---|---|---|---|
| 4,677,086 A | * | 6/1987 | McCue et al. | 123/519 |
| 4,894,072 A | * | 1/1990 | Turner et al. | 123/519 |
| 5,204,310 A | * | 4/1993 | Tolles et al. | 123/519 |
| 5,206,207 A | * | 4/1993 | Tolles | 502/423 |
| 5,207,808 A | * | 5/1993 | Haruta et al. | 123/519 |
| 5,238,470 A | * | 8/1993 | Tolles et al. | 95/143 |
| 5,250,491 A | * | 10/1993 | Yan | 264/117 |
| 5,276,000 A | * | 1/1994 | Matthews et al. | 502/424 |
| 5,304,527 A | * | 4/1994 | Dimitri | 502/416 |
| 5,324,703 A | * | 6/1994 | McCue et al. | 502/424 |
| 5,337,721 A | * | 8/1994 | Kasuya et al. | 123/519 |
| 5,408,976 A | * | 4/1995 | Reddy | 123/198 D |
| 5,416,056 A | * | 5/1995 | Baker | 502/425 |
| 5,456,236 A | * | 10/1995 | Wakashiro et al. | 123/519 |

(List continued on next page.)

FOREIGN PATENT DOCUMENTS

| | | |
|---|---|---|
| EP | 11 13163 | 7/2001 |
| KR | 2002012826 A * | 2/2002 |
| WO | WO 92/01585 | 9/1992 |
| WO | WO 01/62367 | 8/2001 |

*Primary Examiner*—David A. Simmons
*Assistant Examiner*—Frank M. Lawrence
(74) *Attorney, Agent, or Firm*—Terry B. McDaniel; Daniel B. Reece, IV; Thomas A. Boshinski (57) ABSTRACT

Disclosed is a method for sharply reducing diurnal breathing loss emissions from automotive evaporative emissions control systems by providing multiple layers, or stages, of adsorbents. On the fuel source-side of an emissions control system canister, high working capacity carbons are preferred in a first canister (adsorb) region. In subsequent canister region(s) on the vent-side, the preferred adsorbent should exhibit a flat or flattened adsorption isotherm on a volumetric basis and relatively lower capacity for high concentration vapors as compared with the fuel source-side adsorbent. Multiple approaches are described for attaining the preferred properties for the vent-side canister region. One approach is to use a filler and/or voidages as a volumetric diluent for flattening an adsorption isotherm. Another approach is to employ an adsorbent with the desired adsorption isotherm properties and to process it into an appropriate shape or form without necessarily requiring any special provision for dilution. The improved combination of high working capacity carbons on the fuel source-side and preferred lower working capacity adsorbent on the vent-side provides substantially lower diurnal breathing emissions without a significant loss in working capacity or increase in flow restriction compared with known adsorbents used in canister configurations for automotive emissions control systems.

30 Claims, 3 Drawing Sheets

U.S. PATENT DOCUMENTS

| | | | |
|---|---|---|---|
| 5,456,237 A | * 10/1995 | Yamazaki et al. | 123/519 |
| 5,460,136 A | * 10/1995 | Yamazaki et al. | 123/519 |
| 5,477,836 A | * 12/1995 | Hyodo et al. | 123/519 |
| 5,538,932 A | * 7/1996 | Yan et al. | 502/424 |
| 5,564,398 A | * 10/1996 | Maeda et al. | 123/519 |
| 5,691,270 A | * 11/1997 | Miller | 502/174 |
| 5,736,481 A | * 4/1998 | Miller | 502/174 |
| 5,736,485 A | * 4/1998 | Miller | 502/174 |
| 5,863,858 A | * 1/1999 | Miller et al. | 502/180 |
| 5,914,294 A | * 6/1999 | Park et al. | 501/100 |
| 5,914,457 A | * 6/1999 | Itakura et al. | 123/519 |
| 6,136,075 A | * 10/2000 | Bragg et al. | 55/519 |
| 6,171,373 B1 | * 1/2001 | Park et al. | 95/138 |
| 6,279,548 B1 | * 8/2001 | Reddy | 123/519 |
| 6,284,705 B1 | * 9/2001 | Park et al. | 502/180 |
| 6,488,748 B2 | 12/2002 | Yamafuji et al. | |

* cited by examiner

FIGURE 1

PRIOR ART

METHOD FOR REDUCING EMISSIONS FROM EVAPORATIVE EMISSIONS CONTROL SYSTEMS

This application claims the benefit of U.S. Provisional Application No. 60/335,897 filed on Nov. 21, 2001.

BACKGROUND OF THE INVENTION

1. Field of the Invention

This invention relates to a method for reducing emissions from evaporative control systems including activated carbon particulate-filled canisters and adsorptive monolith-containing canisters, which monoliths include activated carbon, and to using said adsorbing canisters to remove volatile organic compounds, and other chemical agents from fluid streams. More particularly, this invention relates to using said vapor-adsorbing materials in hydrocarbon fuel consuming engines.

2. Description of Related Art (Including Information Disclosed Under 37 CFR 1.97 and 37 CFR 1.98)

(a) Standard Working Capacity Adsorbents

Evaporation of gasoline from motor vehicle fuel systems is a major potential source of hydrocarbon air pollution. The automotive industry is challenged to design engine components and systems to contain, as much as possible, the almost one billion gallons of gasoline evaporated from fuel systems each year in the United States alone. Such emissions can be controlled by canister systems that employ activated carbon to adsorb and hold the vapor that evaporates. Under certain modes of engine operation, the adsorbed hydrocarbon vapor is periodically removed from the carbon by drawing air through the canister and burning the desorbed vapor in the engine. The regenerated carbon is then ready to adsorb additional vapor. Under EPA mandate, such control systems have been employed in the U.S. for about 30 years, and during that time government regulations have gradually reduced the allowable emission levels for these systems. In response, improvements in the control systems have been largely focused on improving the capacity of the activated carbon to hold hydrocarbon vapor. For example, current canister systems, containing activated carbon of uniform capacity, are readily capable of capturing and releasing 100 grams of vapor during adsorption and air purge regeneration cycling. These canister systems also must have low flow restrictions in order to accommodate the bulk flow of displaced air and hydrocarbon vapor from the fuel tank during refueling. Improvements in activated carbons for automotive emission control systems are disclosed in U.S. Pat. Nos.: 4,677,086; 5,204,310; 5,206,207; 5,250,491; 5,276,000; 5,304,527; 5,324,703; 5,416,056; 5,538,932; 5,691,270; 5,736,481; 5,736,485; 5,863,858; 5,914,294; 6,136,075; 6,171,373; 6,284,705.

Figure 1:
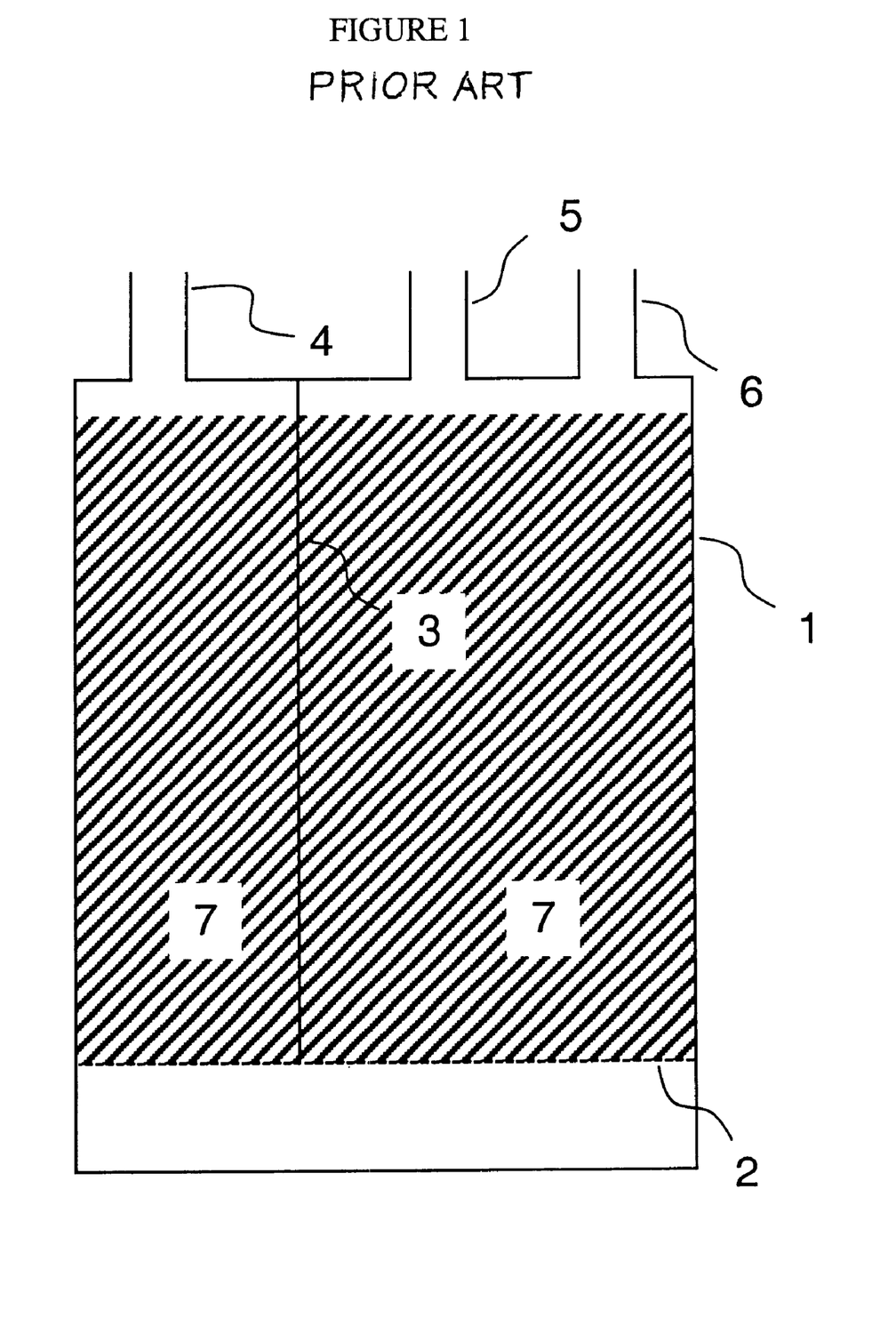
FIG. 1 shows, in cross-section, a prior art canister system.

A typical canister employed in a state of the art auto emission control system is shown in FIG. 1. Canister 1 includes support screen 2, dividing wall 3, a vent port 4 to the atmosphere (for when the engine is off), a vapor source connection 5 (from the fuel tank), a vacuum purge connection 6 (for when the engine is running), and adsorbent material fill 7.

Other basic auto emission control system canisters are disclosed in U.S. Pat. Nos. 5,456,236; 5,456,237; 5,460,136; and 5,477,836.

Typical carbons for evaporative emission canisters are characterized by standard measurements of bed packing density ("apparent density," g/mL), equilibrium saturation capacity for 100% butane vapor ("butane activity," g/100 g-carbon), and purgeability ("butane ratio"), specifically, the proportion of adsorbed butane from the saturation step which can be recovered from the carbon by an air purge step. The multiplicative product of these three properties yields a measure of the carbon's effective butane "working capacity" ("BWC", g/dL), measured by ASTM D5228-92, which has been established in the art as a good predictor of the canister working capacity for gasoline vapors. Carbons that excel for this application have high BWC, typically 9 to 15+g/dL BWC, as a result of high saturation capacities on a volumetric-basis for butane (the product of density and butane activity), and high butane ratios (>0.85). In terms of isothermal equilibrium adsorption capacities across all vapor concentrations, these carbons characteristically have high incremental capacity as a function of increased vapor concentration (i.e., isotherm curved upward on a semi-log graph). This isotherm upward curve reflects the high working capacity performance feature of these carbons, in that gasoline vapors are adsorbed in high quantity at high concentrations but readily released in high concentration to an air purge stream. In addition, these carbons tend to be granular (somewhat irregularly shaped) or cylindrical pellet, typically of a size just about 1–3 mm in diameter. It has been found that somewhat larger sizes hinder diffusional transport of vapors into and out of the carbon particle during dynamic adsorb and purge cycles. On the other hand, somewhat smaller size particles have unacceptably high flow restriction for displaced air and hydrocarbon vapors during refueling.

(b) Diurnal Breathing Loss (DBL) Requirements

Recently, regulations have been promulgated that require a change in the approach with respect to the way in which vapors must be controlled. Allowable emission levels from canisters would be reduced to such low levels that the primary source of emitted vapor, the fuel tank, is no longer the primary concern, as current conventional evaporative emission control appears to have achieved a high efficiency of removal. Rather, the concern now is actually the hydrocarbon left on the carbon adsorbent itself as a residual "heel" after the regeneration (purge) step. Such emissions typically occur when a vehicle has been parked and subjected to diurnal temperature changes over a period of several days, commonly called "diurnal breathing losses." Now, the California Low Emission Vehicle Regulation makes it desirable for these diurnal breathing loss (DBL) emissions from the canister system to be below 10 mg ("PZEV") for a number of vehicles beginning with the 2003 model year and below 50 mg, typically below 20 mg, ("LEV-II") for a larger number of vehicles beginning with the 2004 model year. ("PZEV" and "LEV-II" are criteria of the California Low Emission Vehicle Regulation.)

While standard carbons used in the commercial canisters excel in terms of working capacity, these carbons are unable to meet DBL emission targets under normal canister operation. Furthermore, none of the standard measures of working capacity properties correlate with DBL emission performance. Nonetheless, one option for meeting emission targets is to significantly increase the volume of purge gas during regeneration in order to reduce the amount of residual hydrocarbon heel in the carbon bed and thereby reduce subsequent emissions. This strategy, however, has the drawback of complicating management of the fuel/air mixture to the engine during purge regeneration and tends to adversely affect tailpipe emissions, i.e., moving or redefining the problem rather than solving it. (See U.S. Pat. No. 4,894,072.)

Another option is to design the carbon bed so that there is a relatively low cross-sectional area on the vent-side of the canister system (the first portion of the bed to encounter purge air), either by redesign of the existing canister dimensions or by the installation of a supplemental, auxiliary vent-side canister of appropriate dimensions. This alternative has the effect of locally reducing residual hydrocarbon heel by increasing the intensity of purge for that vent-side portion of the bed, thereby improving its ability to retain vapors that would otherwise be emitted from the canister system under diurnal breathing conditions. The drawback is that there is a useful limit to which a portion of the bed can be elongated at reduced cross-sectional area without otherwise incurring excessive flow restriction by the canister system. In practice, this limit does not allow employing a sufficiently narrowed and elongated geometry to meet emission targets. (See U.S. Pat. No. 5,957,114.)

Another option for increasing the purge efficiency of a fuel vapor/air mixture fraction adsorbed in the pores of the adsorbent material is suggested by the teachings of U.S. Pat. Nos. 6,098,601 and 6,279,548 by providing a heating capability internal of the canister, or a section thereof, either to increase pressure in the vapor storage canister to expel hot vapor through the vapor/purge conduit back into the fuel tank where it condenses at the lower ambient temperature therein ('601) or to increase the purging efficiency of hydrocarbons from the heated adsorbent material and carry the purged fuel vapor to the induction system of an associated engine ('548). However, this increases the complexity of control system management, and there appears some inherent safety concerns in providing heating internal of a canister for trapping fuel vapors.

Thus, an acceptable remedy, which does not have drawbacks as the cited alternative approaches, is greatly desired. It is submitted that the invention disclosed and claimed herein provides the desired solution.

SUMMARY OF THE INVENTION

An invention is disclosed for sharply reducing diurnal breathing loss emissions from evaporative emissions canisters by the use of multiple layers, or stages, of adsorbents. On the fuel source-side of the canister, standard high working capacity carbons are preferred. On the vent-side, the preferred adsorbent volume exhibits a flat or flattened adsorbent isotherm on a volumetric basis in addition to certain characteristically desirable adsorptive properties across broad vapor concentrations, specifically relatively low incremental capacity at high concentration vapors compared with the fuel source-side adsorbent volume. Two approaches are described for attaining the preferred properties for the vent-side adsorbent volume. One approach is to use a filler and/or bed voidages as a volumetric diluent for flattening an isotherm. A second approach is to employ an adsorbent with the desired isotherm properties and to process it into an appropriate shape or form without necessarily requiring any special provision for dilution. Both such approaches provide a substantially lower emissions canister system without a significant loss in working capacity or an increase in flow restriction compared with prior art adsorbents used for automotive emissions control.

DESCRIPTION OF THE PREFERRED EMBODIMENT(S)

The disclosed invention relates to the use of multiple beds (or layers, stages, or chambers) of adsorbent materials, which, in combination, significantly reduce DBL emissions while maintaining the high working capacity and low flow restriction properties of the canister system. (See FIG. 2.) These adsorbents include activated carbon from a variety of raw materials, including wood, peat, coal, coconut, synthetic or natural polymer, and a variety of processes, including chemical and/or thermal activation, as well as inorganic adsorbents, including molecular sieves, porous alumina, pillared clays, zeolites, and porous silica, and organic adsorbents, including porous polymers. The adsorbents may be in granular, spherical, or pelletized cylindrical shapes, or may be extruded into special thin-walled cross-sectional shapes, such as hollow-cylinder, star, twisted spiral, asterisk, configured ribbons, or other shapes within the technical capabilities of the art. In shaping, inorganic and/or organic binders may be used. The adsorbents may be formed into a monolith or honeycomb part. The adsorbents may be incorporated into a canister as one or more layers, or separate chambers, or they may be inserted in the fluid stream flow as auxiliary canister beds.

One common feature for all of these approaches is to have a vent-side adsorbent with a relatively flat-shaped isotherm. This isotherm shape is important for reasons related to purge efficiency across the adsorbent bed depth. For an adsorbent with a flat adsorption isotherm, the concentration of hydrocarbon vapor in equilibrium with adsorbed hydrocarbon, by definition, decreases further as the adsorbed hydrocarbon is removed compared with an adsorbent with a more steeply sloped isotherm. Thus, when such a material is employed as an adsorbent volume on the vent-side region of a canister, purge is able to reduce the vapor concentration in the area of the purge inlet to a very low level. Since it is the vapor near the purge inlet that eventually emerges as bleed, decreasing this concentration reduces the bleed emission level. The degree of removal of adsorbed hydrocarbon during purge is determined by the difference between the concentration of hydrocarbon picked up in the purge gas and the concentration in equilibrium with the adsorbent at any point in the bed. Thus, adsorbent in the immediate vicinity of the purge inlet will be most thoroughly regenerated. At points deeper in the adsorbent bed, less hydrocarbon will be removed because the purge gas will already contain hydrocarbon removed from previous points in the bed. An adsorbent with a flatter adsorption isotherm will give up less vapor into the purge stream and this purge will then be more efficient in reducing vapor concentrations deeper into the bed. Therefore, for a given quantity of purge gas, it will be possible to reduce the vapor concentration in a volume of adsorbent with a flat adsorption isotherm to a lower level than the concentration in the same volume of an adsorbent with a steep adsorption isotherm. Bleed emission from such a volume will therefore be lower when the adsorbent has a flatter adsorption isotherm.

A region within a canister containing particulate or in an adsorbent-containing monolith with the preferred adsorption isotherm properties for achieving low bleed emission levels will, however, have a relatively low adsorption working capacity compared to the activated carbons commonly used in automotive evaporative emission control. For example, the BWC of a low capicity adsorbent will be about 6 g/dL compared to the 9 g/dL to 15+g/dL range as used in typical automotive carbons. Therefore, in order to maintain the required hydrocarbon capacity for normal emission control system operation, the low-bleed adsorbent will be used in a vent-side auxiliary region within the canister or outside the canister in combination with an fuel source-side region containing a volume of the high capacity carbon normally employed. When two different adsorbents are used, for example, system design will involve providing sufficient volume of the high capacity carbon in the main part, or fuel source-side, of an emisssion control canister to achieve the desired working capacity, and a sufficient volume of the low-bleed adsorbent to contain vapor emitted from the main bed to such an extent that such vapor does not materially affect the bleed emissions from the low-bleed adsorbent.

In the context of the invention, "monolith" is intended to include foams, woven and non-woven fibers, mats, blocks and bound aggregates of particulates.

It is notable that the emission of vapor from the main, high-capacity fuel source-side volume of adsorbent into the auxiliary lower capacity vent-side volume is significantly affected by the presence of that vent-side volume. During purge, a vent-side adsorbent volume having a flat adsorption isotherm will give up a relatively small hydrocarbon load into the purge gas. Therefore, the concentration of vapor carried by the purge gas will be low as it emerges from the low-bleed vent-side volume and enters the high-capacity, fuel source-side volume. This allows good regeneration of the high-capacity adsorbent in the vicinity of the junction of the two adsorbent volumes, and helps protect the vent-side volume from emissions from the fuel source-side region of the canister during diurnal breathing flow. Specifically, the greater regeneration efficiency of the fuel source-side volume reduces diurnal emissions by retarding the rate of bulk phase diffusion across the flow length of the canister system. Since bulk phase diffusion is a major mode of vapor transport during diurnal breathing conditions, by reducing the vapor concentration difference across the flow length of the canister system by enhanced regeneration, the redistribution of vapors within the canister system and subsequent emissions into the vent-side volume and out of the vent port are reduced.

Figure 3:
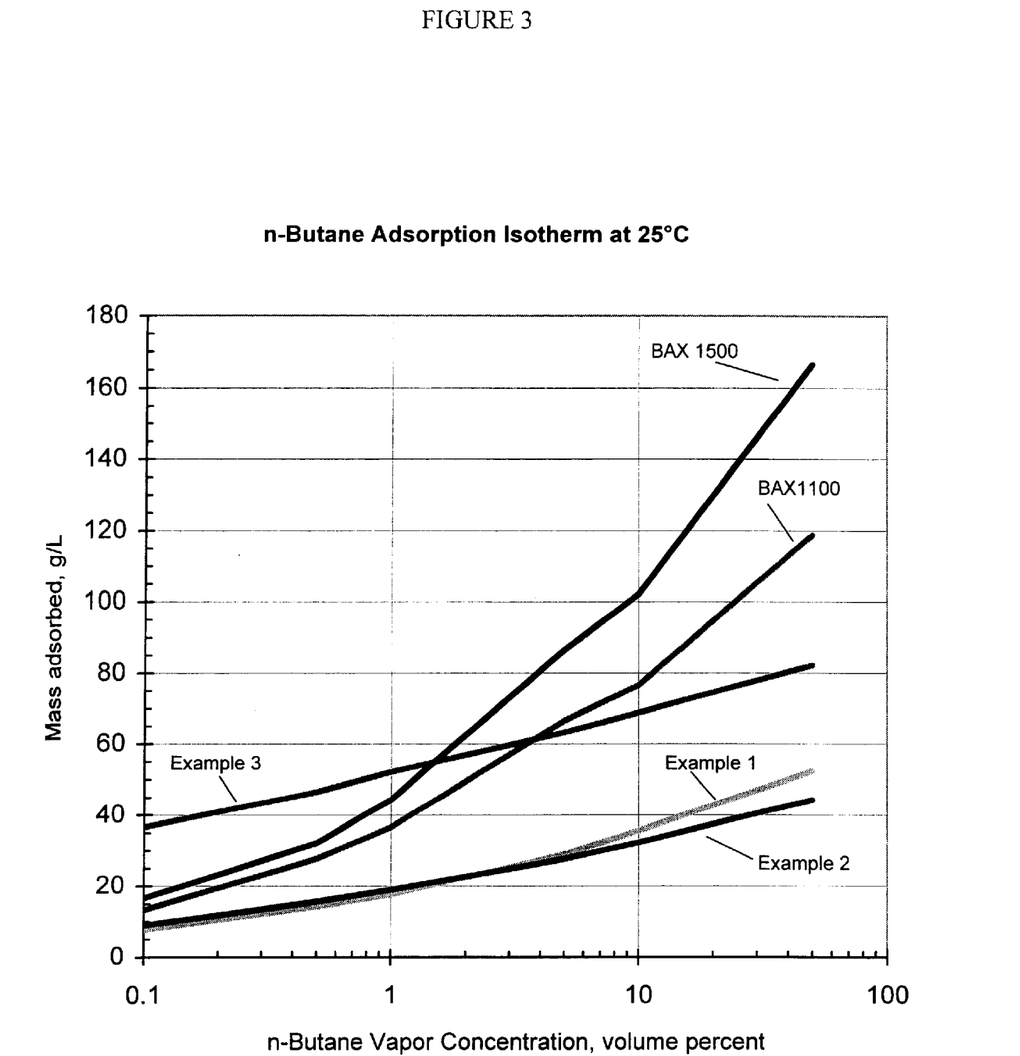
FIG. 3 shows butane isotherm properties for different activated carbon adsorbents.

Examples of adsorbents with isotherms having the preferred shape to provide low bleed performance are compared with standard canister-fill carbons (Westvaco Corporation's BAX 1100 and BAX 1500) in FIG. 3. It is important to note that, as shown in this figure, the isotherm properties must be defined in terms of volumetric capacity. On this basis, the preferred low-bleed adsorbent portion will have an incremental n-butane capacity of less than about 35 g/liter between 5 and 50 volume percent n-butane vapor concentration.

While in some instances, known adsorbents may have the preferred properties for the vent-side, these adsorbents would not be expected to be useful in an evaporative canister. In some cases, these materials have low purgeability (butane ratio less than 0.85) and low working capacity (BWC less than 9 g/dL) as measured by the standard BWC test for qualifying canister carbons. Common wisdom and experience in the art associate low butane ratio with high residual hydrocarbon heel, which is the potential source for high emissions. Furthermore, low BWC adsorbents were not considered useful for inclusion into a canister system as working capacity for gasoline vapors would be assumed impaired, with no expectation that there would be a utility for reducing emissions. In fact, one preferred embodiment of this invention, lower capacity adsorbents have BWC values preferably below 8 g/dL, which is well below the 9–15+g/dL BWC level normally deemed suitable for use in evaporative emission control canister systems. The preferred selection of these low BWC materials for inclusion into a canister system as a vent-side layer to produce low emissions was only realized once the dynamics within the adsorbent bed were realized (i.e., the significance of low residual vapor concentration within the vent-side bed volume and the interactive effect that the vent-side bed volume has on the distribution and diffusion of vapor across the entire canister system during the diurnal breathing loss period).

Therefore, it has been found that the preferred vent-side adsorbent properties, in addition to a relatively low BWC, includes butane ratios between 0.40 and 0.98, which in total are substantially different properties compared with adsorbents previously conceived as useful for these canister systems.

The proposed alternative approaches described above are shown to be effective in canister bleed emission control in the following examples. One approach for preparing the vent-side adsorbent is to volumetrically dilute a high working capacity adsorbent so that its resulting isotherm is flattened on a volumetric basis. A second approach is to begin with an adsorbent that has the desired adsorption capacity and flat isotherm shape and process it into a shape or form, such as a pellet or honeycomb.

Figure 2:
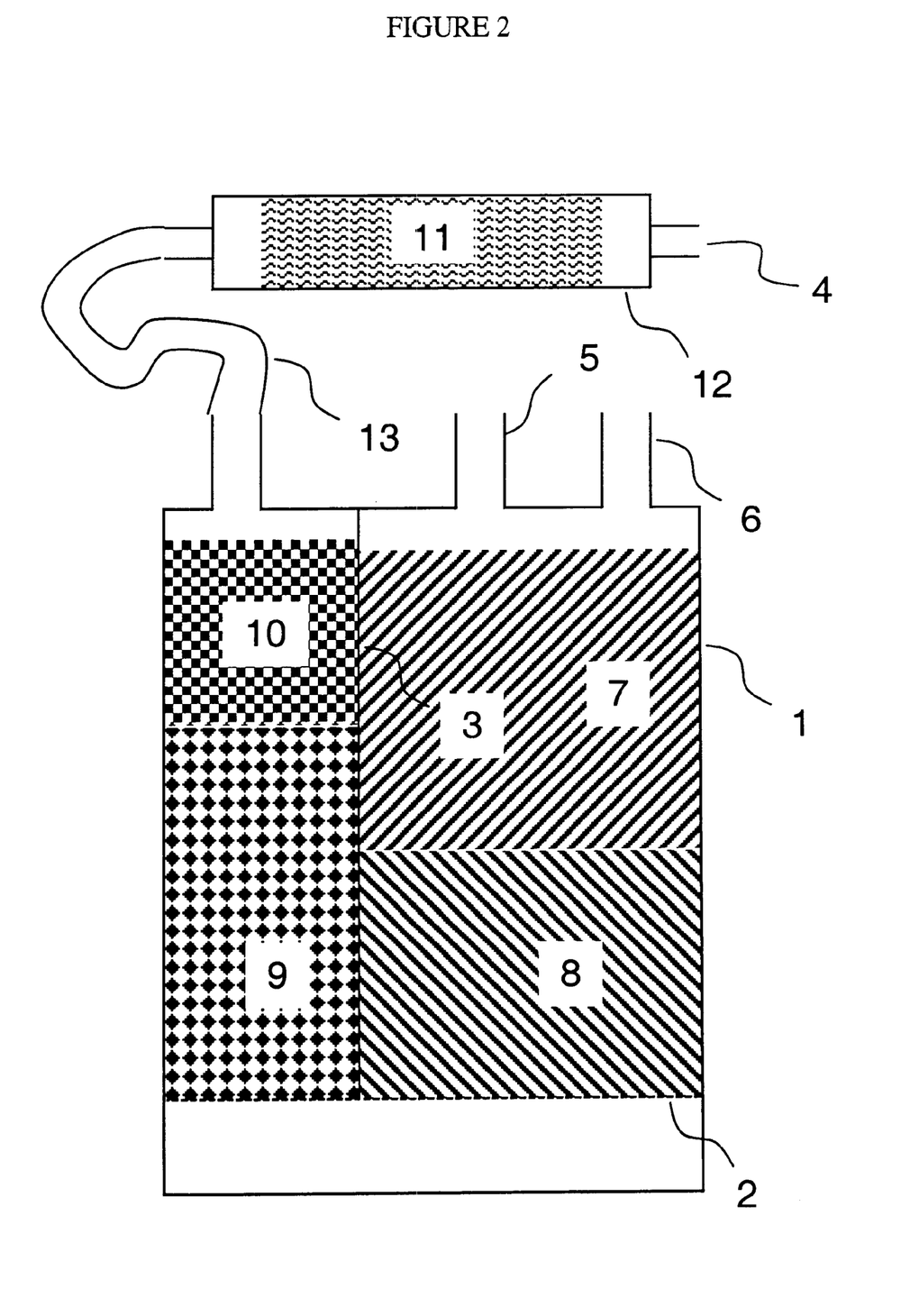
FIG. 2 shows, in cross-section, one embodiment-of the invention canister comprising multiple adsorbents.

A particular preferred embodiment for a canister with multiple adsorbents is shown in FIG. 2. FIG. 2 shows a canister system comprising a primary canister body 1, a support screen 2, a dividing wall 3, a vent port 4 to the atmosphere, a vapor source connection 5, a vacuum purge connection 6, a fuel source-side region 7, vent-side canister regions 8–11 of varying low-capacities, supplemental canister body 12, and connecting hose 13 permitting fluid stream flow from the primary canister body 1 to the supplemental canister body 12. Additional embodiments, as discussed above, are also envisioned to be within the scope of the subject of the invention.

The desired results for the subject matter of the invention can be attained with a single vent-side uniform lower capacity adsorbent material as the subsequent adsorbent material. The option of multiples of lower capacity adsorbents with the desirable adsorptive properties across broad vapor concentrations is demonstrated merely as one embodiment.

The measures for gasoline working capacity (GWC) and emissions in the Table were derived from the Westvaco DBL test that uses a 2.1 L canister. The pellet examples were tested as a 300 mL vent-side layer within the canister, with the 1800 mL of BAX 1500 pellets as the remaining canister fill. The honeycomb was tested as an auxiliary bed canister that was placed in-line with the 2.1 L main canister of BAX 1500 pellets. For all examples, the canister system was uniformly first preconditioned by repetitive cycling of gasoline vapor adsorption and air purge (400 bed volumes air). This cycling generated the GWC value. Butane emissions were subsequently measured after a butane adsorption and an air purge step, specifically during a diurnal breathing loss period when the canister system was attached to a temperature-cycled fuel tank. The reported value is the $2^{nd}$ day DBL emissions during an 11-hour period when the fuel tank was warmed and vapor-laden air was vented to the canister system and exhausted from the vent-side adsorbent where the emissions were measured. The procedure employed for measuring DBL emissions has been described in *SAE Technical Paper* 2001-01-0733, titled "Impact and Control of Canister Bleed Emissions," by R. S. Williams and C. R. Clontz.

Example 1: Microsphere Filler Pellets. These 2 mm pellets are an example of the volumetric dilution method by adding a solid filler to the extrusion formulation. The pellets were prepared from an extrusion blend consisting of Westvaco SA-1500 powder (12.8 wt %), solid glass microsphere filler (79.7 wt % PQ Corporation A3000), bentonite clay (7.2 wt %), and phosphoric acid (0.3 wt %). The pellets were tumbled for four minutes, dried overnight at 105° C., and subsequently heat-treated in steam at 650° C. for 15 minutes. An appropriate non-adsorbing filler reduces adsorption capacities across all vapor concentrations, resulting in a flattened adsorption isotherm ("Example 1" in FIG. 3). Alternative methods for diluting the vent-side region are to co-mix adsorbent granules or pellets with inert filler particles of similar size, to form the extrusion paste into high voidage shapes such as hollow cylinders, asterisks, stars, or twisted, bent, or spiral ribbon pieces, or to place multiple thin layers of non-adsorbing particles or porous mats (e.g., foam), or simply trapped air space between layers of adsorbent.

Example 2: Ceramic-Bound Honeycomb. The 200 cpsi (cells per square inch) carbon-containing honeycomb is another example of the volumetric dilution method. The honeycomb in the Table was prepared according to the method described in U.S. Pat. No. 5,914,294, which discloses forming an adsorptive monolith comprising the steps of (a) extruding an extrudable mixture through an extrusion die such that a monolith is formed having a shape wherein the monolith has at least one passage therethrough and the extrudable mixture comprises activated carbon, a ceramic forming material, a flux material, and water, (b) drying the extruded monolith, and (c) firing the dried monolith at a temperature and for a time period sufficient to react the ceramic forming material together and form a ceramic matrix. The extrudable mixture is capable of maintaining the shape of the monolith after extrusion and during drying of the monolith.

In this example, the extrusion formulation ingredients partially dilute the carbon adsorbent, and in addition, the adsorbent is further diluted by the open cell structure of the extruded part. These cells create more bed voidages within the part, compared with a similar bed volume of pellets (65 vol % voidages for the honeycomb versus 35 vol % for pellets or granules). The cell structure and high bed voidages have the added advantage of imposing minimal additional flow restriction compared with a bed of pellets, thereby allowing the honeycomb to be installed to the main canister as an add-on auxiliary device of greatly reduced cross-sectional area (see supplemental canister body 12 in FIG. 2).

Example 3: Special Precursor Pellets: These 2 mm pellets were prepared by selecting the adsorbent to be extruded according to its intrinsic flat isotherm adsorption properties. In this example, there was no special provision for filler in the formulation or bed voidage dilution from the extruded shape. The ingredients for the extrusion blend producing the tested activated carbon pellets consisted of SX 1 grade activated carbon produced by NORIT (93.2 wt %) and sodium carboxymethyl cellulose binder system (6.8 wt %). The pellets were tumbled for four minutes, dried overnight at 105° C., and subsequently heat-treated in air at 150° C. for three hours.

As noted above, the comparisons of these activated carbon containing materials, prepared as set forth in the examples, is shown in the following Table.

TABLE

Performance, Properties, and Formulations for Alternative Vent-Side Adsorbents

|  | Filled Pellet | Ceramic-Bound Honeycomb | Special Precursor Pellet | Prior Art: High Working Capacity Carbons | |
|---|---|---|---|---|---|
| Fuel source-side BAX 1500 Volume: | 1800 mL | 2100 mL | 1800 mL | 1800 mL | 1800 mL |
| Vent-Side Adsorbent Type: | "Ex. 1" | "Ex. 2" | "Ex. 3" | BAX 1100 | BAX 1500 |
| Vent-Side Mode: | Layer | Auxiliary Bed | Layer | Layer | Layer |
| Vent-Side Adsorbent Volume: | 300 mL | 200 mL 41 mm diameter × 150 mm long, 200 cpsi | 300 mL | 300 mL | 300 mL |
| Canister System Performance: Westvaco DBL Test |  |  |  |  |  |
| Gasoline Working Capacity, g: | 138 | 144 | 132 | 143 | 139 |
| 2$^{nd}$ Day DBL Emissions, mg-C$_4$: | 29 | 10 | 13 | 88 | 221 |
| Note: | (1) | (2) | (3) | (4) | (5) |
| Vent-Side Properties (6) |  |  |  |  |  |
| Incremental Adsorption At 25° C. |  |  |  |  |  |
| 5–50 vol % butane vapor, g/L: | 24 | 16 | 18 | 52 | 80 |
| Apparent Density, g/mL: | 0.869 | 0.355 | 0.453 | 0.358 | 0.284 |
| Butane Activity, g/100 g: | 7.0 | 13.1 | 18.5 | 39.0 | 64.7 |
| BWC, g/dL: | 5.7 | 4.0 | 5.0 | 11.9 | 16.0 |
| Butane Ratio: | 0.929 | 0.852 | 0.593 | 0.852 | 0.868 |

(1) Two DBL Test; Averaged data for GWC (400 bed volume purge) and DBL emissions (150 bed volume purge); 2.1L canister, 1500 mL fuel source-side chamber, 600 mL vent-side chamber, fuel source-side chamber cross-sectional area 2.5 times the vent-side cross-sectional area.
(2) Single DBL Test
(3) Average of three DBL Tests
(4) Average of three DBL Tests
(5) Average of six DBL Tests
(6) Density and BWC by ASTM standard techniques.

The Table shows data for the three examples of these two approaches compared with vent-side layers containing high working capacity carbons, BAX 1100 and BAX 1500. Compared with the state of the art BAX carbons (the FIG. 3), all three of the examples have significantly lower capacities for butane at high concentrations and considerably flatter isotherm curves.

As shown in the Table, the examples demonstrate reductions in emissions by factors of 3–22 over canisters consisting of only high working capacity carbons. There was either no loss or only a slight loss in GWC.

A further preferred embodiment of the invention method is presented in an evaporative emissions control system for a vehicle, the system comprising, in combination, a fuel tank for storing a volatile fuel, an engine having an air induction system and adapted to consume the fuel, a canister containing an initial volume of fuel vapor adsorbent material for temporarily adsorbing and storing fuel vapor from the tank, a conduit for conducting fuel vapor from the tank to a canister vapor inlet, a fuel vapor purge conduit from a canister purge outlet to the induction system of the engine, and a vent/air opening for venting the canister and for admission of air to the canister during operation of the engine induction system, wherein the canister defines a fuel vapor flow path via the canister vapor inlet through the initial volume of vapor adsorbent within a first region of the canister toward the vent/air opening, and an air flow path through a subsequent volume of adsorbent within a second region of the canister at the vent/air opening and the first region at the purge outlet, such that fuel vapor formed in the tank flows through the vapor inlet into the initial volume of adsorbent where it is adsorbed and, during operation of the engine induction system, ambient air flows in a path to and through the vent/air opening and along the air flow path in the canister through the initial volume and the purge outlet to the induction system of the engine, the flow of air removing a portion of the adsorbed fuel vapor but leaving a residue of fuel in the initial volume, wherein at least one subsequent volume of vapor adsorbent material comprises a volume of 1% to 100% of the first volume and is located either inside of the canister within the second region thereof or outside of the canister, and wherein the initial volume of vapor adsorbent material is characterized by an incremental adsorption capacity at 25° C. of greater than 35 g n-butane/L between vapor concentrations of 5 vol % and 50 vol % n-butane before routing the fluid stream through at least one subsequent volume of vapor adsorbent material wherein the subsequent volume of vapor adsorbent material is characterized by an incremental adsorption capacity at 25° C. of less than 35 g n-butane/L between vapor concentrations of 5 vol % and 50 vol % n-butane.

This invention method certainly includes an embodiment wherein the second volume of vapor adsorbent material is located outside the canister in a separate subsequent canister, but in the flow path of the ambient air to the vent/air inlet and the first region.

This invention method includes an embodiment wherein the initial volume of vapor adsorbent material and the subsequent volume of vapor adsorbent material are activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer having been activated by a process selected from the group consisting of chemical, thermal, and combined chemical/thermal activation methods.

The invention method includes an embodiment wherein the initial volume of vapor adsorbent material and the subsequent volume of vapor adsorbent material are inorganic materials selected from the group consisting of zeolites, porous silica, porous alumina, pillared clays, and molecular sieves.

The invention method includes an embodiment wherein the initial volume of vapor adsorbent material and the subsequent volume of vapor adsorbent material are porous polymers.

The invention method includes an embodiment wherein the subsequent volume of vapor adsorbent material exhibits adsorption capacities achieved by volumetric dilution.

The invention method further includes and embodiment wherein the volumetric dilution is accomplished by the addition of a non-adsorbing filler as a co-ingredient by an addition process selected from the group consisting of addition with the activated carbon raw material prior to activation, addition with the adsorbent before forming into a shaped particle or monolith, and a combination thereof.

The invention method further includes an embodiment wherein the volumetric dilution is accomplished by forming the adsorbent material into high voidage shapes selected from the group consisting of stars, hollow cylinders, asterisks, spirals, cylinders, configured ribbons, and other shapes within the capabilities of the art.

The method claimed herein includes an embodiment wherein the volumetric dilution is accomplished by forming the adsorbent into a honeycomb or monolith shape.

The method claimed herein includes an embodiment wherein the volumetric dilution is accomplished by the use of inert spacer particles, foams, fibers, and screens external to the vent-side adsorbent particles and monoliths.

The method claimed herein includes an embodiment wherein the non-adsorbing filler is a solid after processing.

Also, the method claimed herein includes an embodiment wherein the non-adsorbing filler is volatized or combusted to form voidages larger than 50 Å width within the shaped particle or monolith.

The foregoing description relates to embodiments of the present invention, and changes and modifications may be made therein without departing from the scope of the invention as defined in the following claims.

We claim:

1. A method for reducing fuel vapor emissions in automotive evaporative emissions control systems comprising the steps of contacting the fuel vapor with an initial adsorbent volume having incremental adsorption capacity at 25° C. of greater than 35 g n-butane/L between vapor concentrations of 5 vol % and 50 vol % n-butane and at least one subsequent adsorbent volume having an incremental adsorption capacity of less than 35 g n-butane/L between vapor concentrations of 5 vol % and 50 vol % n-butane.

2. The method of claim 1 comprising a single subsequent adsorbent volume.

3. The method of claim 1 comprising multiple subsequent adsorbent volumes.

4. The method of claim 2 wherein the initial adsorbent volume and the subsequent adsorbent volume are located within a single automotive evaporative emission control canister.

5. The method of claim 3 wherein the-initial adsorbent volume and the subsequent adsorbent volumes are located within a single automotive evaporative emission control canister.

6. The method of claim 2 wherein the initial adsorbent volume and the subsequent adsorbent volume are located in separate canisters that are connected to permit sequential contact by the fuel vapor.

7. The method of claim 3 wherein the initial adsorbent volume and at least one subsequent adsorbent volume are located in separate canisters that are connected to permit sequential contact by the fuel vapor.

8. The method of claim 1 wherein the initial adsorbent volume and the subsequent adsorbent volume are activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer having been activated by a process selected from the group consisting of chemical, thermal, and combined chemical/thermal activation methods.

9. The method of claim 1 wherein the initial adsorbent volume and the subsequent adsorbent volume are inorganic materials selected from the group consisting of zeolites, porous silica, porous alumina, pillared clays, and molecular sieves.

10. The method of claim 1 wherein the initial adsorbent volume and the subsequent adsorbent volume are porous polymers.

11. The method of claim 1 wherein the subsequent adsorbent volume exhibits adsorption capacities achieved by volumetric dilution.

12. The method of claim 11 wherein the volumetric dilution is accomplished by the addition of a non-adsorbing filler as a co-ingredient by an addition process selected from the group consisting of addition with the activated carbon raw material prior to activation, addition with the adsorbent before forming into a shaped particle or monolith, and a combination thereof.

13. The method of claim 11 wherein the volumetric dilution is accomplished by forming the adsorbent into high voidage shapes selected from the group consisting of stars, hollow cylinders, asterisks, spirals, cylinders, and configured ribbons.

14. The method of claim 11 wherein the volumetric dilution is accomplished by forming the adsorbent into a honeycomb or monolith shape.

15. The method of claim 11 wherein the volumetric dilution is accomplished by the use of inert spacer particles, trapped air spaces, foams, fibers, and screens external to the adsorbent.

16. The method of claim 12 wherein the non-adsorbing filler is a solid after processing.

17. The method of claim 12 wherein the non-adsorbing filler is volatized or combusted to form voidages larger than 50 Å width within the shaped particle or monolith.

18. In a method of reducing fuel vapor emissions in an automotive evaporative emissions control system comprising removing at least one volatile organic compound from a volatile organic compound-containing fuel vapor by routing the fuel vapor through a vapor adsorbent, the improvement comprising sequentially routing the fuel vapor through an initial adsorbent material-containing volume wherein the initial adsorbent material is characterized by an incremental adsorption capacity at 25° C. of greater than 35 g n-butane/L between vapor concentrations of 5 vol % and 50 vol % n-butane before routing the fluid stream through at least one subsequent adsorbent-containing volume prior to venting to the atmosphere wherein the subsequent adsorbent-containing volume is characterized by an incremental adsorption capacity at 25° C. of less than 35 g n-butane/L between vapor concentrations of 5 vol % and 50 vol % n-butane.

19. The method of claim 18 wherein the initial adsorbent volume and the subsequent adsorbent volume are located in a single automotive evaporative emissions canister.

20. The method of claim 18 wherein the initial adsorbent volume and the subsequent adsorbent volume are located in separate canisters that are connected to permit sequential contact by the fuel vapor.

21. The method of claim 18 wherein the initial adsorbent volume and the subsequent adsorbent volume are activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer and activated by chemical and/or thermal activation methods.

22. The method of claim 18 wherein the initial adsorbent volume and the subsequent adsorbent volume are inorganic materials selected from the group consisting of zeolites, porous silica, and molecular sieves.

23. The method of claim 18 wherein the initial adsorbent volume and the subsequent adsorbent volume are porous polymers.

24. The method of claim 18 wherein the subsequent adsorbent volume exhibits adsorption capacities achieved by volumetric dilution.

25. The method of claim 24 wherein the volumetric dilution is accomplished by the addition of a non-adsorbing filler as a co-ingredient by an addition process selected from the group consisting of addition with the activated carbon raw material prior to activation, addition with the adsorbent before forming into a shaped particle or monolith, and a combination thereof.

26. The method of claim 24 wherein the volumetric dilution is accomplished by forming the adsorbent into high voidage shapes selected from the group consisting of stars, hollow cylinders, asterisks, spirals, cylinders, and configured ribbons.

27. The method of claim 24 wherein the volumetric dilution is accomplished by forming the adsorbent into a honeycomb or monolith shape.

28. The method of claim 24 wherein the volumetric dilution is accomplished by the use of inert spacer particles, trapped air spaces, foams, fibers, and screens external to the adsorbent.

29. The method of claim 25 wherein the non-adsorbing filler is a solid after processing.

30. The method of claim 25 wherein the non-adsorbing filler is volatized or combusted to form voidages larger than 50 Å width within the shaped particle or monolith.

* * * * *

UNITED STATES PATENT AND TRADEMARK OFFICE
CERTIFICATE OF CORRECTION

PATENT NO. : 6,540,815 B1
DATED : April 1, 2003
INVENTOR(S) : Laurence H. Hiltzik et al.

It is certified that error appears in the above-identified patent and that said Letters Patent is hereby corrected as shown below:

Title page,
Item [56], References Cited, U.S. PATENT DOCUMENTS, insert:
-- 5,957,114    9/1999        Johnson et al.
   6,078,601    8/2000        Reddy --.

Drawings,
Sheet 1, beneath Figure 1 delete "Prior Art."

Column 8,
Table, Footnote 1, delete "Test" and insert therefor -- Tests --.

Signed and Sealed this

Twenty-sixth Day of August, 2003

JAMES E. ROGAN
*Director of the United States Patent and Trademark Office*